(12) United States Patent
Okamitsu et al.

(10) Patent No.: US 8,044,767 B2
(45) Date of Patent: Oct. 25, 2011

(54) SMART ENTRY SYSTEM FOR VEHICLE (75) Inventors: Atsushi Okamitsu, Hiroshima (JP);
Teruo Yoshii, Hiroshima (JP); Takahiro Inada, Hiroshima (JP)

(73) Assignee: Mazda Motor Corporation (JP)

( * ) Notice: Subject to any disclaimer, the term of this patent is extended or adjusted under 35 U.S.C. 154(b) by 994 days.

(21) Appl. No.: 11/440,161

(22) Filed: May 25, 2006

(65) Prior Publication Data

US 2006/0279402 A1 Dec. 14, 2006

(30) Foreign Application Priority Data

Jun. 9, 2005 (JP) ................................. 2005-169560
Jun. 9, 2005 (JP) ................................. 2005-169575

(51) Int. Cl.
*G05B 19/00* (2006.01)

(52) U.S. Cl. ...................................... 340/5.61; 340/5.72

(58) Field of Classification Search .................. 340/5.71, 340/5.61, 4.37, 4.11; 307/10.1
See application file for complete search history.

(56) References Cited

U.S. PATENT DOCUMENTS

| 4,719,460 A | | 1/1988 | Takeuchi et al. | |
| 4,906,035 A | * | 3/1990 | Nagai et al. | 292/201 |
| 4,973,958 A | | 11/1990 | Hirano et al. | |
| 5,912,631 A | | 6/1999 | Kusunoki | |
| 6,114,819 A | * | 9/2000 | Porter et al. | 318/466 |
| 6,191,703 B1 | | 2/2001 | Wallace | |
| 6,259,168 B1 | * | 7/2001 | Okada | 307/10.5 |
| 6,624,741 B1 | * | 9/2003 | Dais et al. | 340/5.72 |

FOREIGN PATENT DOCUMENTS

| JP | 11-006341 | 1/1999 |
| JP | 2002-220958 | 8/2002 |
| JP | 2002-339609 | 11/2002 |
| JP | 2003-269019 | 9/2003 |

OTHER PUBLICATIONS

European Search Report dated Aug. 3, 2006 Application No. EP 06 00 9655.

* cited by examiner

*Primary Examiner* — Vernal Brown
(74) *Attorney, Agent, or Firm* — Studebaker & Brackett PC; Donald R. Studebaker (57) ABSTRACT

In a lock-out prevention control, in which when a portable device is locked out in a trunk room, an alarm is conducted and a latch of a trunk latch mechanism is controlled to its unlatch state without ID verification with a portable device, in the case where an operation of door lock is conducted by the portable device after a start of the alarm (step SB8), the alarm is stopped (step SB12) and the lock-out prevention control is prohibited. The lock-out prevention control is also prohibited when a switch located in a vehicle cabin is operated (step SB9) regardless of the door lock operation by the portable device. Thereby, the vehicle security and the utility or facility can be improved.

1 Claim, 9 Drawing Sheets

SMART ENTRY SYSTEM FOR VEHICLE

BACKGROUND OF THE INVENTION

The present invention relates to a smart entry system for a vehicle that enables an operation, such as a door unlock, that is conducted by a passenger carrying a portable device when ID verification is confirmed with the portable device.

A smart entry system, in which an onboard device receives ID (identification) signal that is transmitted by a portable device and when verification of ID (identification) code contained in the ID (identification) signal is confirmed, a vehicle door unlock, an engine start or the like are granted, is known.

Specifically, for example, Japanese Patent Laid-Open Publication No. 2003-269019 discloses the smart entry system, in which at the door unlock operation or the engine start, when the onboard transmitter transmits the request signal and in response to this the portable device transmits the ID signal containing the ID code, the onboard smart key control unit conducts the ID verification based on the ID signal from the portable device. Herein, when this ID verification is confirmed, namely when the ID code contained in the ID signal matches ID code that is stored at the smart keyless control unit, the smart keyless control unit outputs a signal to grant the door unlock or the engine start, and thereby a passenger can execute the door unlock or the engine start with necessary operations.

Further, another type of smart entry system, in which the above-described ID verification with the potable device is conducted additionally at operation of a trunk handle and locking of a trunk lid is cancelled with confirmation of the ID verification, may be considered. Herein, a lock mechanism of the trunk lid is configured such that the trunk lid is mechanically locked when it is closed and it is unlocked by a motor that is operated in response to an unlock signal. Thus, the trunk lid cannot be unlocked by operation of the trunk handle unless the motor is operated. Herein, the unlock signal to operate the motor is transmitted, for example, when the ID verification with the portable device is confirmed with the portable device or when the passenger operates a trunk lever located in a vehicle cabin.

In the above-described smart entry system, in a case where the trunk lid is closed with the portable device located therein, the trunk lid is mechanically locked and thereby the portable device is locked out so that it could not be taken out. In order to avoid this situation, some countermeasure is considered, in which an alarm is conducted to notify the situation and the motor is configured so as to be operated by the operation of the trunk handle without confirmation of ID verification with another portable device. Thereby, the trunk lid is forced to be unlocked by the trunk handle, so it can be opened despite the portable device being locked out. This is a so-called lock-out prevention control.

However, the smart entry system equipped with the above-described lock-out prevention control would have the following problems.

Namely, since the trunk lid is allowed to be unlocked and opened by the operation of the trunk handle without the confirmation of ID verification with another portable device, any unauthorized person who does not carry any portable device to conduct the ID verification could open the trunk lid while the passenger is away form the vehicle, so the vehicle security would deteriorate.

Further, there is a case where the passenger intentionally puts the above-described portable device in the trunk. For example, the passenger puts a spare portable device in a bag or something and then the bag or the like is carried in the trunk. In this case, however, the same situation described above would be established with the spare portable device being located in the trunk, and thus the same problem of the deterioration of the vehicle security described above would occur. Accordingly, the passenger could not put the spare portable device in the trunk in a carefree manner, so utility or facility of the portable device would be deteriorated either.

Also, in a case where the passenger drives a so-called open car type of vehicle, since the car has generally a relatively small baggage space in the vehicle cabin, the passenger tends to put the portable device in the bag and put them in the trunk together in order to prevent the portable device from being lost. In this case, the similar situation to the above would take place as well.

SUMMARY OF THE INVENTION

The present invention has been devised in view of the above-described problems, and an object of the present invention is to provide a smart entry system for a vehicle equipped with a lock-out prevention control, that can improve the vehicle security and the utility or facility as well.

According to the present invention, there is provided a smart entry system for a vehicle, which comprises an onboard transmitter operative to transmit a request signal at least inside a trunk and outside the vehicle, which are separated from a vehicle cabin, a portable device operative to transmit an ID signal when receiving the request signal from the onboard transmitter, and an onboard receiver operative to receive the ID signal from the portable device, in which when a trunk handle for opening a trunk lid is operated, the onboard transmitter is made transmit the request signal outside the vehicle, and when ID verification based on the ID signal received by the onboard receiver is confirmed, the trunk lid is unlocked, the smart entry system comprising a lock-out prevention control device operative to prevent lock-out of the portable device by unlocking the trunk lid, the lock-out prevention control device unlocking the trunk lid according to an operation of the trunk handle when the ID verification based on the ID signal received by the onboard receiver in response to the request signal, which is transmitted inside the trunk by the onboard transmitter when the trunk lid is closed, is confirmed, and an unlock prohibition device operative to prohibit unlock of the trunk lid by the lock-out prevention control device in a specified state.

According to the present invention, since the lock-out prevention control device and the unlock prohibition device to prohibit unlock of the trunk lid by the lock-out prevention control device in the specified state are provided, appropriate effects or advantages of the smart entry system equipped with the lock-out prevention control can be effectively attained, avoiding properly problems that could be caused by the conventional lock-out prevention control. As a consequence, the vehicle security and the utility or facility can be improved properly.

According to an embodiment of the present invention, the above-described specified state is when a specified operation is conducted to the vehicle after the trunk lid is unlocked by the lock-out prevention control device.

Thereby, even in the case where the passenger intentionally puts the portable device in the trunk, the unlock of the trunk lid by the lock-out prevention control device can be prohibited by the passenger conducting the specified operation, so the trunk lid can be prevented surely from being opened by the unauthorized person not carrying the portable device. Both the vehicle security and the utility or facility can be improved properly.

According to another embodiment of the present invention, an alarm is conducted when the lock-out prevention control device unlocks the trunk lid.

Thereby, the passenger can be properly notified of a situation where the lock-out of the portable device could occur with the alarm.

According to another embodiment of the present invention, the portable device is configured so as to transmit a door lock signal to lock a door of the vehicle, and the specified operation is to make the portable device located outside the vehicle transmit the door lock signal.

Thereby, since the passenger's intention of leaving the vehicle with the portable device being located in the trunk is reflected surely by prohibiting the unlock of the trunk lid by the lock-out prevention control device with the door lock operation, the vehicle security and the utility or facility can be improved properly. Further, since the trunk lid can be unlocked by the operation of the above-described portable device enabling the door lock control, the lock-out of the portable device can be prevented surely.

According to another embodiment of the present invention, the above-described specified operation is to operate a switch located inside the vehicle cabin.

Thereby, even in the case where the passenger does not have at hand the above-described portable device enabling the door lock control, the unlock of the trunk lid by the lock-out prevention control device can be prohibited surely by the passenger operating the switch located inside the vehicle cabin. Further, in this situation where the passenger can operate the switch in the vehicle cabin, the passenger could also operate a trunk lever for opening the trunk lid that is normally located in the vehicle cabin. Thus, the lock-out of the portable device can be prevented surely, and that is further preferable in terms of the security.

According to further another embodiment of the present invention, the above-described specified state is when an ignition switch is turned on or when the vehicle travels.

Thereby, even in the case where the passenger intentionally puts the portable device in the trunk, the unlock of the trunk lid by the lock-out prevention control device can be prohibited when the ignition switch is turned on or when the vehicle travels, so the trunk lid can be prevented surely from being opened by the unauthorized person not carrying the portable device. Accordingly, the vehicle security and the utility or facility can be improved properly.

According to another embodiment of the present invention, an alarm is conducted when the lock-out prevention control device unlocks the trunk lid, and there is provided an alarm prohibition device to prohibit the conduct of the alarm when the ignition switch is turned on or when the vehicle travels.

Thereby, since the alarm is stopped when the lock-out prevention control becomes unnecessary, the passenger can be prevented from feeling uncomfortable by unnecessary alarm.

According to another embodiment of the present invention, at least one of the conduct of the alarm and the unlock of the trunk lid is granted when the ignition switch is turned off or when the vehicle stops traveling.

Thereby, when the passenger is likely to leave the vehicle after driving, the lock-out prevention control is restarted and at least one of the conduct of the alarm and the unlock of the trunk lid is granted. Thus, the lock-out of the portable device can be prevented surely. Further, in the case where the conduct of the alarm is granted, the passenger is notified by the alarm that the portable device remains in the trunk, so the lock-out of the portable device can be prevented in advance. Accordingly, the vehicle security and the utility or facility can be improved properly.

According to another embodiment of the present invention, there is further provided a prohibition device to prohibit at least one of the conduct of the alarm and the unlock of the trunk lid when a door lock operation is conducted in the vehicle cabin.

Thereby, in a case where the passenger is in the vehicle cabin so as to operate the trunk lever located in the vehicle cabin, the unnecessary lock-out prevention control is prevented properly. Thus, the security does not deteriorate improperly. Further, the lock-out prevention control can be prohibited surely by the door lock operation regardless of the state of the ignition switch being turned on or the vehicle traveling. Accordingly, the deterioration of the security can be avoided further surely.

According to another embodiment of the present invention, there is further provided an engine start control device operative to start an engine of the vehicle, wherein the engine start control device starts the engine when the ID verification based on the ID signal received by the onboard receiver in response to the request signal, which is transmitted inside the vehicle cabin and inside the trunk by the onboard transmitter when the ignition switch is operated for engine starting.

Thereby, since the engine can be just started with the portable device being located in the trunk, the utility or facility can be improved properly. Further, since the lock-out prevention control and the like, described above, are conducted with the portable device being located in the trunk, the vehicle security and the utility or facility can be improved properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. However, the following descriptions are just about exemplified embodiments and do not intend to limit any application or use of the present invention. Also, it should be understood that even though embodiments are separately described, single features thereof may be combined to additional embodiments.

Figure 1:
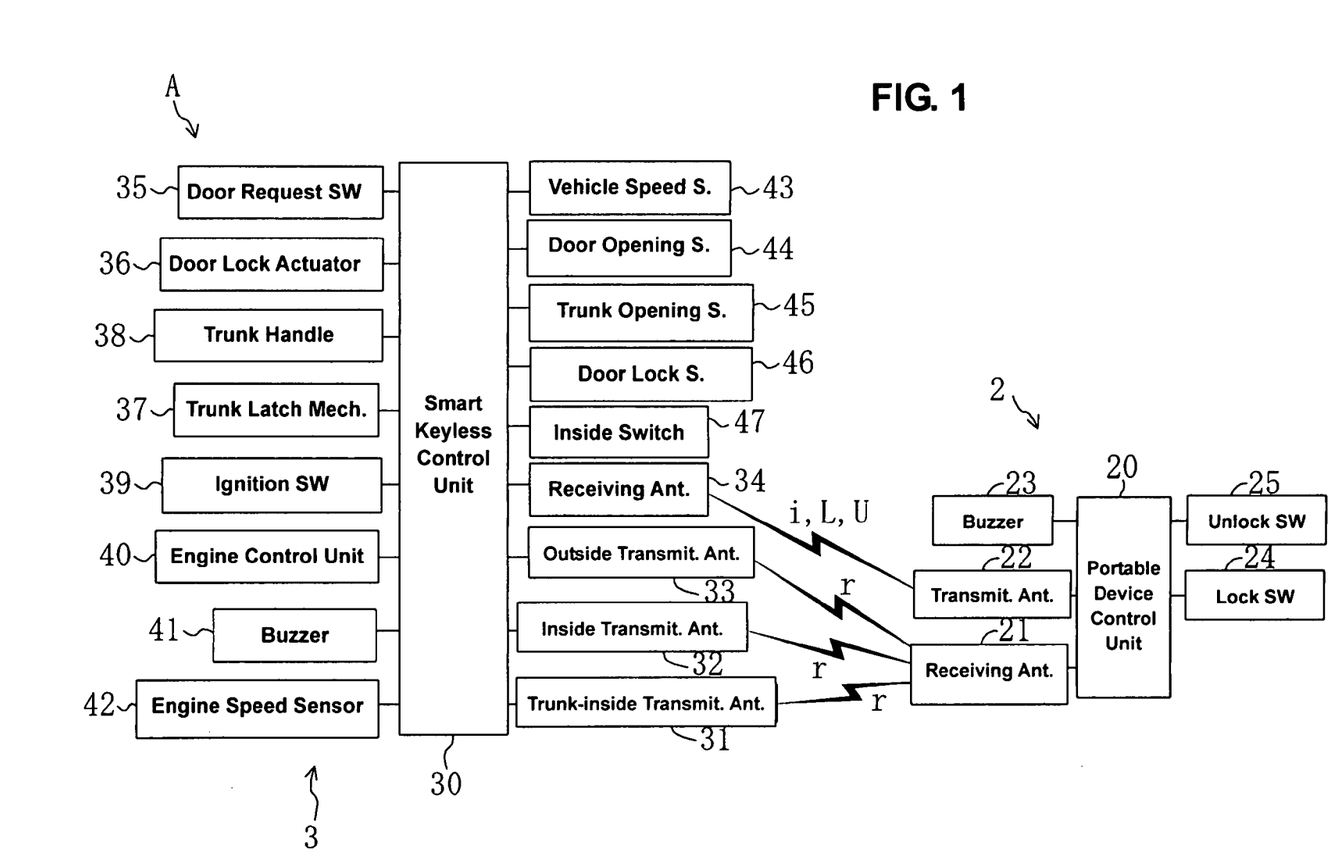
FIG. 1 is a block diagram of a smart entry system for a vehicle according to an embodiment of the present invention.
Figure 2:
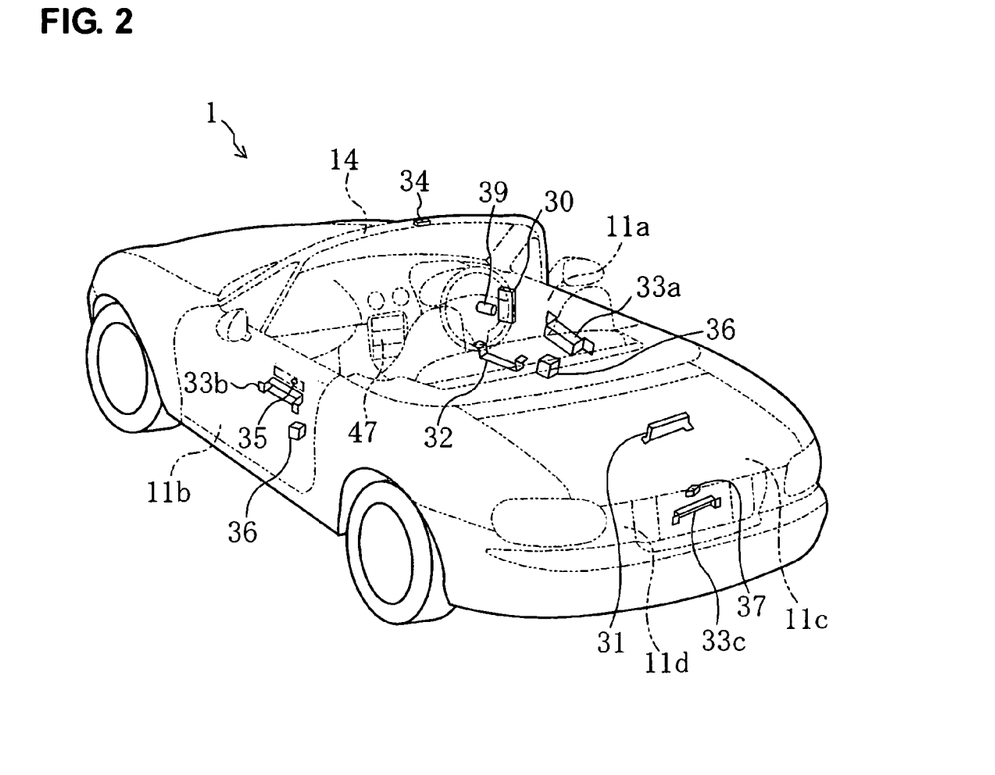
FIG. 2 is a perspective view of a vehicle equipped with the smart entry system for a vehicle.

FIG. 1 shows an entire structure of a smart entry system A according to an embodiment 1 of the present invention. The system A comprises a portable device 2 as a portable transmitter/receiver that a passenger carries and an onboard device 3 that is installed at a vehicle 1. FIG. 2 is a perspective view of vehicle 1, an open car type, equipped with the onboard device 3.

The portable device 2 comprises a control unit 20 comprising CPU. To this control unit 20 are operationally coupled a receiving antenna 21 to receive a request signal r from the onboard device 3 and a transmitting antenna 22 to transmit ID signal i containing an ID code (code for ID verification), a lock signal L for door lock and an unlock signal U for door unlock. Namely, for example, when the receiving antenna 21 receives the request signal r from the onboard device 3, the control unit 20 makes the transmitting antenna 22 transmit the ID signal i containing the ID code in response to the request signal r. Herein, the ID signal i, lock signal L and unlock signal U are signals with the same frequency range.

Further, to the control unit 20 of the portable device 2 are operationally coupled a buzzer 23 to produce an alarm sound in response to an alarm signal from the onboard device 3, a lock switch 24 for door lock, and an unlock switch 25 for door unlock. Thus, a keyless entry system for a remote control of the door lock/unlock is provided.

The above-described onboard device 3 comprises a smart keyless control unit 30 comprising CPU as a control device. To this smart keyless control unit 30 are operationally coupled a signal trunk-inside-transmitting antenna 31, a signal inside-transmitting antenna 32 and a signal outside-transmitting antenna 33 (onboard transmitter), which transmit the request signal r to the portable device 2, and a signal onboard-receiving antenna 34 (onboard receiver) to receive the ID signal i and others from the portable device 2. Namely, when the signal onboard-receiving antenna 34 receives the ID signal i from the portable device 3, the smart keyless control unit 30 conducts verification of the ID code contained in the ID signal i. Thus, various operations (see specific controls described below) are available to the vehicle 1.

Figure 3:
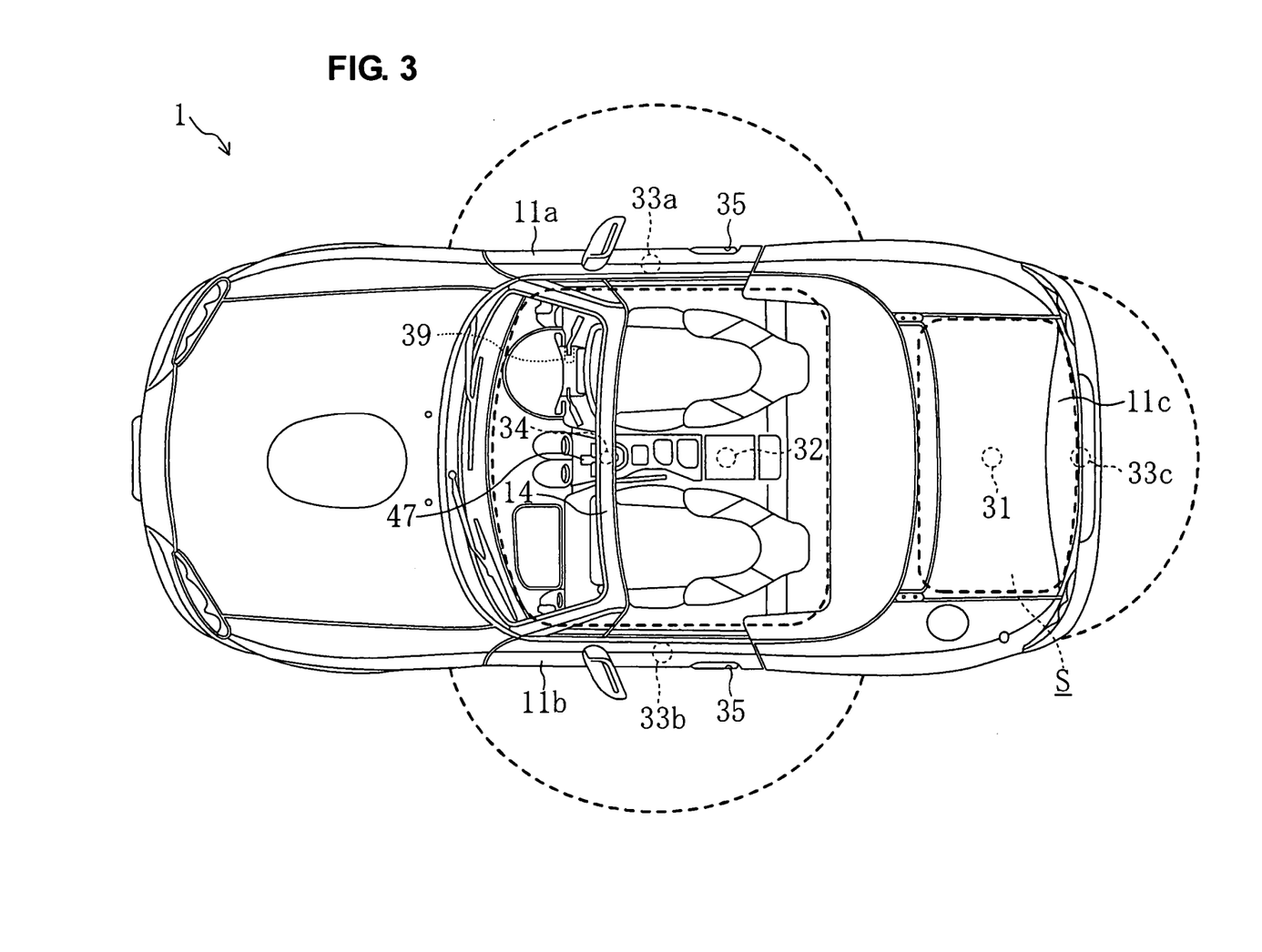
FIG. 3 is an upper view of the vehicle equipped with the smart entry system for a vehicle.

The above-described signal outside-transmitting antenna 33, as shown in FIG. 2, comprises a driver's seat-side transmitting antenna 33a, an assistant's seat-side transmitting antenna 33b and a rear transmitting antenna 33c, which are respectively provided at a driver's-seat-side door 11a, an assistant's-seat-side door 11b and a rear end panel 11d. The signal inside-transmitting antenna 32 is provided at a substantially central portion in a vehicle cabin and the signal trunk-inside-transmitting antenna 31 is provided at a substantially central portion in a trunk room S. And, the signal onboard-receiving antenna 34 is provided at a substantially central portion of a header 14 so as to cover a substantially entire area of the vehicle cabin and around the vehicle 1. Herein, the signal trunk-inside-transmitting antenna 31 is configured such that the request signal r is transmitted only inside the trunk room S, whereby only a portable device 4 (having the same constitution as the above-described portable device 2) that is located in the trunk room S can be detected. Also, the other signal transmitting antennas 32, 33a-33c are configured such that their signals can be transmitted to areas shown by broken lines in FIG. 3.

Further, to the smart keyless control unit 30 are operationally coupled door request switches 35, 35 provided respective door knobs of the driver's-seat-side door 11a and assistant's-seat-side door 11b, and door lock actuators 36, 36 operative to lock or unlock these doors 11a, 11b respectively. Thus, for example, when the passenger (user) carrying the portable device 2 pushes the door request switches 35 in a door-locked state, the request signal r is transmitted from the transmitting antennas 32, 33. Then, the signal onboard-receiving antenna 34 receives the ID signal i transmitted by the transmitting antenna 22 of the portable device 2 in response to the request signal r, and after the verification of the ID code is confirmed, the doors are unlocked by the lock actuators 36. Thus, the so-called smart entry system is operated.

Herein, the door lock/unlock can be operated by not only the above-described smart entry system but the lock/unlock switches 24, 25 being pushed and a key being instated into a door key cylinder and rotated.

Further, to the smart keyless control unit 30 are operationally coupled a trunk latch mechanism 37 (trunk lid lock) that is provided at a rear end of the trunk lid 11c and operative to engage its latch with the closed rear end panel 11d, and a trunk handle 38 operative to unlatch the latch mechanism 37. The trunk latch mechanism 37 is an electric type of device using a motor (see, for example, Japanese Patent Laid-Open Publication Nos. 11-6341 and 2002-220958). Herein, when the trunk lid 11c is closed, its latch is mechanically engaged with a corresponding member. While, when an unlatch command signal P is fed to the motor, the motor operates the latch to its unengaged position.

Figure 4A:
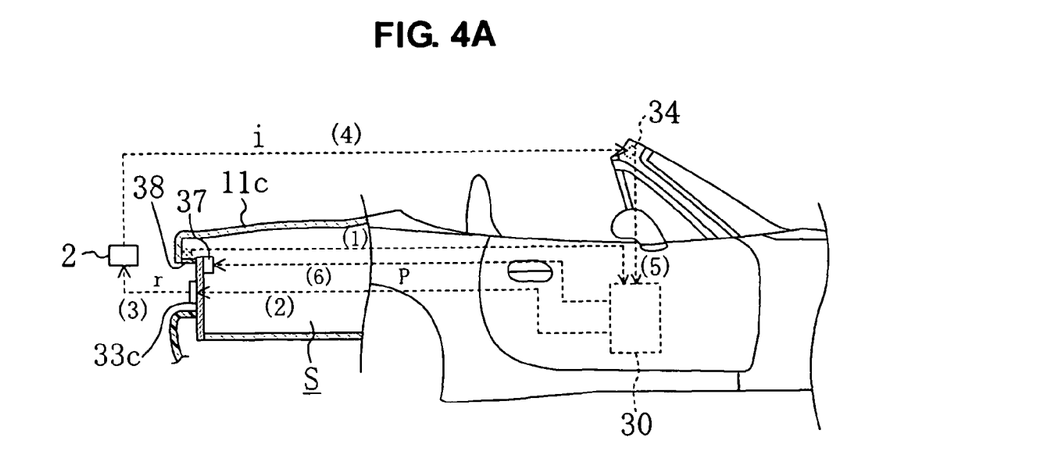
FIG. 4A is an explanatory diagram showing signals at a normal trunk latch control.

In the normal state of the control of the trunk latch mechanism, as shown in FIG. 4A, when the trunk handle 38 is operated in the closed state of the trunk lid 11c, this operation signal (1) is fed to the smart keyless control unit 30 and the rear transmitting antenna 33c transmits the request signal r (3) outside the vehicle according to an output signal (2) from the control unit 30. Then, when the portable device 2 located outside the vehicle transmits the ID signal i (4) in response to the request signal r, the ID signal i is received by the signal onboard-receiving antenna 34 and its received signal (5) is fed to the control unit 30. Herein, when the verification of the ID code contained in this ID signal i is confirmed, the control unit 30 outputs the unlatch command signal P (6) to the motor of the trunk latch mechanism 37, and thereby the latch of the mechanism 37 is unengaged so as to enable the trunk lid 11c to open.

Figure 4B:
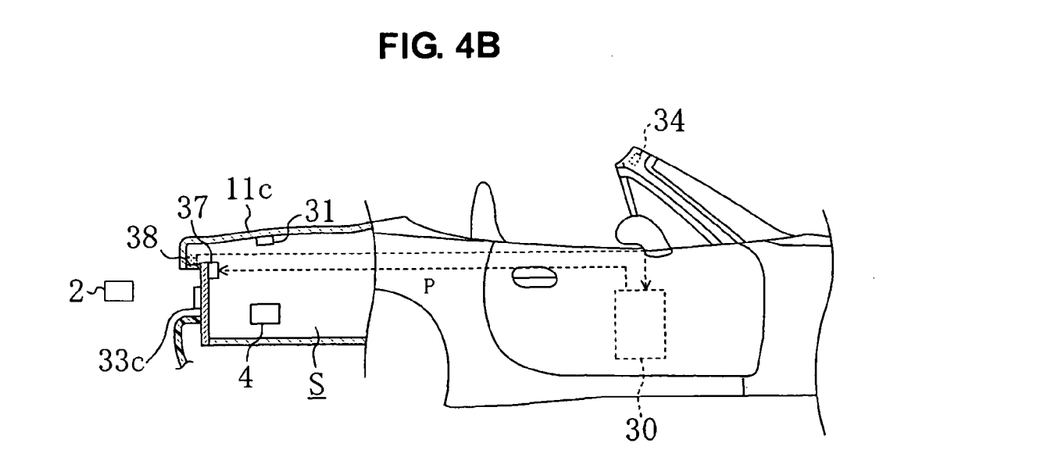
FIG. 4B is an explanatory diagram showing signals at a lock-out prevention control.

Meanwhile, in the case where the portable device 4 is locked out in the trunk room S, an alarm is conducted by a buzzer 41 which will be described below (or the buzzer 23 of the portable device 2). And as shown in FIG. 4B, when the trunk handle 38 is operated, this operation signal is fed to the control unit 30, and without any signal exchanging with the portable device 2, namely, without the verification of the ID signal, the control unit 30 outputs the unlatch command signal P to the motor of the trunk latch mechanism 37, so that the latch of the mechanism 37 can be unengaged.

Furthermore, to the smart keyless control unit 30 are operationally coupled an ignition switch 39 provided near a steering wheel to start the engine of the vehicle 1, and an engine control unit 40 (ECU) operative to start the engine according to the operation of the ignition switch 39. Thereby, when the passenger carrying the portable device 2 rides on the vehicle 1 and the ID verification with the portable device 2 is confirmed, the passenger's operation of the ignition switch 39 enables the smart keyless control unit 30 to output an engine start command signal to the engine control unit 40 and thereby the engine can be started by the engine control unit 40.

Herein, the ignition switch 39 is configured so as to be rotated and take respective positions of accessory OFF, accessory ON, ignition ON and ignition START and to output their position signals to the control unit 30.

Also, to the smart keyless control unit 30 is operationally coupled the buzzer 41 as an alarm device operative to notify the passenger of a situation that the portable device 4 is locked out in the trunk room S. Although the portable device 2 also has the buzzer 23 in the present embodiment, the above-described alarm is conducted by at least one of the buzzers 23, 41.

Further, to the smart keyless control unit 30 are operationally coupled an engine speed sensor 42 to detect the engine speed, a vehicle speed sensor 43 to detect the speed of the vehicle 1, door opening detecting sensors 44, 44 to detect an opening state of the doors 11a, 11b, a trunk opening detecting sensor 45 to detect an opening state of the trunk lid 11c, and door lock detecting sensors 46, 46 to detect a lock state of the doors 11a, 11b.

Herein, a switch 47 (for example, an audio switch, an air conditioner switch etc.) located in the vehicle cabin of the vehicle 1 is operationally coupled to the smart keyless control unit 30. The lock-out prevention control is configured so as to be prohibited by the operation of this switch 47, which will be described below specifically.

The following controls are carried out by the above-described smart keyless control unit 30.

The smart keyless control unit 30 conducts a door lock control in which the lock/unlock operation of the doors 11a, 11b are conducted without the operation of the key inserted into key cylinders of the doors 11a, 11b.

Namely, when the passenger carrying the portable device 2 pushes the door request switch 35 at the engine stop of the vehicle 1, the request signal r is transmitted from the transmitting antennas 32, 33. Then, when the signal onboard-receiving antenna 34 receives the ID signal i that is transmitted by the portable device 2 in response to the request signal r, the verification of the ID code contained in the ID signal i is conducted. In the case where the verification of the ID code is confirmed, the doors 11a, 11b in the locked state is turned to the unlocked state or the doors 11a, 11b in the unlocked state is turned to the locked state. This detection of the lock/unlock state of the doors 11a, 11b is conducted by the door lock detecting sensor 46. The lock/unlock of the doors 11a, 11b is executed by the smart keyless control unit 30 outputting the lock signal L or the unlock signal U to the door lock actuators of the doors.

The above-described control can be attained by not only the door request switches 35 but the lock switch 24 and the unlock switch 25 that are provided at the portable device 2. Namely, for example, when the lock switch 24 is pushed, the lock signal L and the ID signal i of the portable device 2 are transmitted from the transmitting antenna 22 of the portable device 2. Then, when the verification with the ID signal is confirmed by the smart keyless control unit 30 of the onboard device 3, the door lock is executed.

Also, the smart keyless control unit 30 is configured to conduct an engine start control with the engine control unit 40. The engine start control is a control in which the engine is started with the ignition switch 39 being rotated to the ignition START position. Namely, when the passenger rotates the ignition switch 39 to the ignition START position, the request signal r is transmitted from the signal transmitting antenna 32. Then, when the control unit 30 receives ID signal i that is transmitted by the portable device 2 in response to the request signal i, the verification of the ID code contained in the ID signal i is conducted. In the case where the verification of the ID code is confirmed, the control unit 30 has the engine control unit 40 execute the engine start.

Further, the smart keyless control unit 30 is configured to conduct a trunk latch/unlatch control with the trunk latch mechanism 37. Namely, when the ID verification with the portable device 2 located outside the vehicle is confirmed at the operation of the trunk handle 38, the control unit 30 has the trunk latch mechanism 37 unlatch the trunk lid 11c. And, in the case where the portable device 4 is locked out in the trunk room S, the control unit 30 makes the passenger be notified of this situation with the alarm and the control unit 30 also enables the trunk latch mechanism 37 to unlatch the trunk lid 11c without the ID code verification with the portable device 2 located outside the vehicle. Specifically, when the trunk lid 11c is closed, the request signal r is transmitted inside the trunk room S by the signal trunk-inside-transmitting antenna 31. Herein, in the case where the portable device 4 is located in the trunk room S, the portable device 4 transmits the ID signal i in response to the request signal r. Then, the signal onboard-receiving antenna 34 receives the ID signal i and the ID code verification is conducted. In the case where the verification of the ID code is confirmed, the control unit 30 activates the buzzer 41 to notify the passenger of the locked-out situation and the control unit 30 also makes the trunk latch mechanism 37 unlatch the trunk lid 11c according to the operation of the trunk handle 38, without the ID code verification with the portable device 2 located outside the vehicle. Thereby, taking out the portable device 4 from the trunk room S is enabled.

Meanwhile, in the case where the portable device 4 is not locked out in the trunk room S, the ID signal i is not produced even if the request signal r is transmitted inside the trunk room S when the trunk lid 11c is closed. Accordingly, the trunk latch mechanism 37 keeps its latched state until the ID code verification with the portable device 2 according to the operation of the trunk handle 38 is confirmed. Then, when the trunk handle 38 is operated, the request signal r is transmitted outside the vehicle from the rear transmitting antenna 33c. And when the verification of the ID code contained in the ID signal i that is transmitted by the portable device 2 in response to the request signal r is confirmed, the unlatch command signal P is outputted to the motor of the trunk latch mechanism 37. Thereby, the trunk latch mechanism 37 is operated to its unlatched state, so the trunk lid 11c can be opened.

In the case where the lock-out prevention control is conducted with the alarm as described above, the situation of the portable device 4 locked out in the trunk room S can be surely notified to the passenger. Thereby, the portable device 4 can be surely taken out and thus the utility or facility can be improved.

Herein, for example, there might be a case where the passenger wants to put the spare portable 4 in the bag or something and locate them in the trunk room S, and then leaves the vehicle 1. In this case, the above-described lock-out prevention control might enable any unauthorized person to make an access and open the trunk lid 11c while the passenger leaves away from the vehicle, which would deteriorate the security of the vehicle.

Accordingly, in the present embodiment it is considered that the passenger intentionally leave the portable device 4 in the trunk room S when the passenger locks the door with the operation of the lock switch 24 at the portable device 2 or when the passenger closes the door 11a on the driver's-seat side with its door's lock knob in a locked state (so-called in-lock), and the above-described lock-out prevention control is prohibited in these cases. Thereby, any unauthorized person can be prevented from opening the trunk lid 11c, so the security of the vehicle can be improved.

The prohibition of the lock-out prevention control may be also conducted when the switch 47 located in the vehicle cabin (e.g., audio switch, air conditioner switch) is operated. This is because operating the switch in the cabin means that the passenger is in the cabin and the trunk lid 11c can be opened by the trunk lever located in the cabin. Accordingly, with constitution that the lock-out prevention control can be prohibited by the operation of the switch located in the vehicle cabin, for example, even in the case where the passenger could not take out the portable device 2 soon or the door lock would not be necessary, the function of the lock-out prevention control can be prohibited.

Meanwhile, in the case where the vehicle 1 is a two-passenger open car like the present embodiment, since there is a high likelihood of the driver dropping and losing the portable device 2 during driving and the cabin is not so large, the passenger might drive putting the portable device 2 in the trunk room S. In this case, if the above-described lock-out prevention control was conducted, not only the alarm sound could make the driver feel uncomfortable but the trunk lid 11c could expose itself to danger of being opened during the vehicle traveling, thereby deteriorating the safety and the security as well.

Thus, the above-described lock-out prevention control is prohibited in this case, namely, when the vehicle travels or when the ignition switch 39 is in ON (or ACC) position. Accordingly, the unnecessary lock-out prevention control is prohibited temporally, so the security and security can be improved.

And the smart keyless control unit 30 is configured such that the lock-out prevention control is resumed when the vehicle stops in the case where this control is prohibited at the vehicle traveling, or the lock-out prevention control is resumed when the ignition switch 39 is turned to the OFF position in the case where this control is prohibited at this switch being in the ON (ACC) position. Thereby, in the case where the passenger stops the driving of the vehicle 1 and leaves the vehicle 1, the lock-out likelihood situation is notified with the alarm and the unlatch of the trunk latch mechanism 37 is enabled without the ID verification of the portable device. As a result, the portable device 4 can be surely taken out of the trunk room at need.

The prohibition of the lock-out prevention control may be also conducted when the doors are in unlocked state or when the door lock operation is conducted in the vehicle cabin. This is because the operation of the trunk lever located in the cabin is available and there is high likelihood of the vehicle driving in these cases. Namely, these cases might not require the lock-out prevention control.

Figure 5:
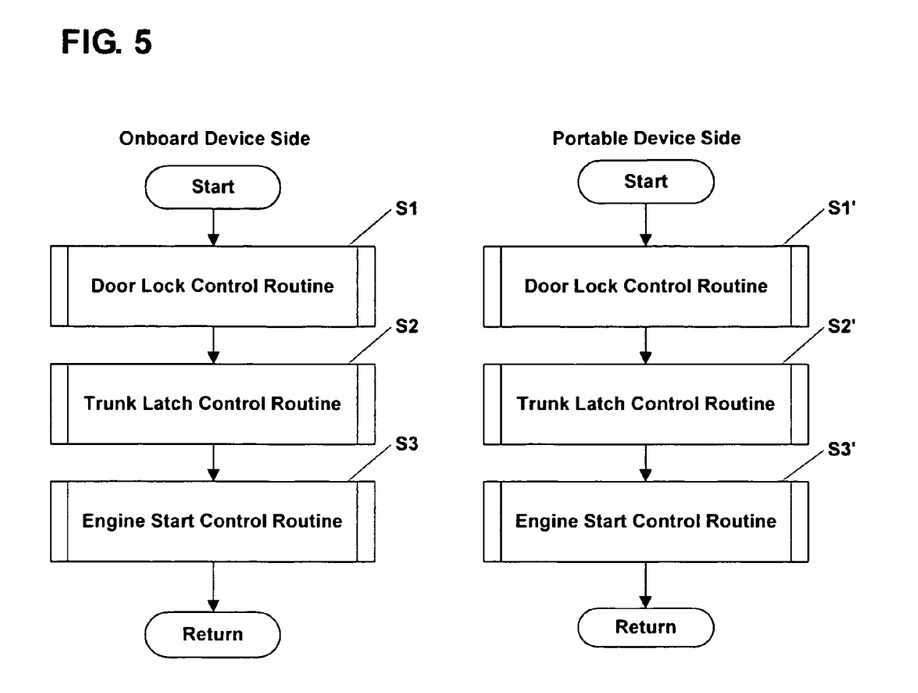
FIG. 5 is flowcharts of a control of an onboard device and a portable device.

The above-described controls are executed with the control unit 20 of the portable device and the smart keyless control unit 30 as shown in flowcharts of FIG. 5. Specifically, on the side of the onboard device 3, after the start of the flowchart, as shown in FIG. 5, the door lock control for door lock/unlock is executed in step S1. Subsequently, the trunk latch control for the trunk latch mechanism 37 is executed in step S2. Then, the engine start control for the engine start is executed in step S3, and this flowchart is followed again (return). On the side of the portable device 2, the respective controls are executed following the flowchart at the right in FIG. 5 in the same manner, whose description is omitted here.

Hereinafter, the specific controls of the flowcharts in FIG. 5 will be described.

<Door Lock Control>

Figure 6:
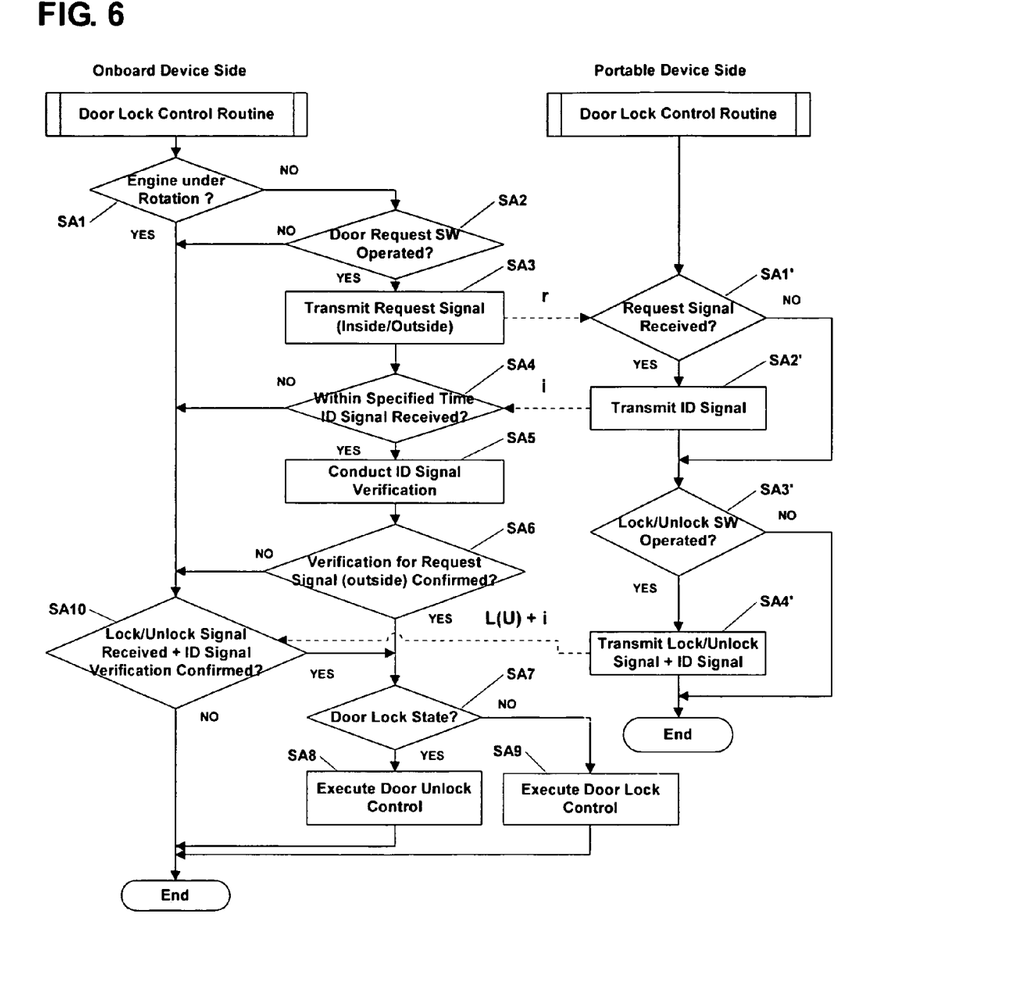
FIG. 6 is flowcharts of a door lock control of the onboard device and the portable device.

Flowcharts of the door lock control by the onboard device 3 and the portable device 2 are shown in FIG. 6. First, the door lock control by the onboard device 3 will be described, and after that the door lock control by the portable device 2 will be described.

—Onboard Device—

After the start of the flowchart at the left in FIG. 6, it is determined in step SA1 whether the engine is under rotation or not according to an output signal of the engine speed sensor 42. When it is determined that the engine is under rotation (YES), it is determined in step SA10 whether the lock signal L or the unlock signal U are transmitted or not and, if they are transmitted, it is determined whether the verification of ID signal i is confirmed or not. Meanwhile, when it is determined that the engine is not under rotation (NO), the door lock/unlock control using the smart entry system will be executed after step SA2.

In the step SA2, it is determined whether the door request switch 35 is operated or not. When it is determined that the door request switch 35 is not operated (NO), it is determined in the step SA10 whether or not the portable device 2 transmits the lock signal L or the unlock signal U. Meanwhile, when it is determined in the step SA2 that the door request switch 35 is operated (YES), the request signal r is transmitted to the portable device 2.

Then, it is determined in step SA4 whether or not the ID signal i is received from the portable device 2 within a specified period of time after the transmission of the request signal r. When it is determined that the ID signal i is not received (NO), the control sequence proceeds to the step SA10. Meanwhile, it is determined that the ID signal i is received (YES), the verification of the ID code of the ID signal i received is conducted and it is determined whether the verification is confirmed or not (steps SA5, SA6). Herein, the above-described specified period of time in the step SA4 is set to be time enough to receive the ID signal i from the portable device 2 by the signal onboard-receiving antenna 34 after the request signal r is transmitted to the portable device 2.

When the verification of the ID code of the ID signal i from the portable device 2 verification is not confirmed (NO in the step SA6), the control sequence proceeds to the step SA10. When the verification is confirmed (YES), it is determined in step SA7 whether the door is locked or not according to the output signal of the door lock detecting sensor 46. When it is determined that the door is locked in the step SA7 (YES), the door unlock control is executed in step SA8 to unlock the door, then this control sequence ends (End). Meanwhile, when it is determined that the door is not locked in the step SA7 (NO), the door lock control is executed in step SA9 to lock the door, then this control sequence ends (End).

In the step SA10, it is determined whether or not the lock signal L or the unlock signal U are transmitted from the portable device 2 and, if they are transmitted, it is determined whether the verification of ID signal i is confirmed or not. Herein, when it is determined that the signals are transmitted and the verification is confirmed (YES), the control sequence proceeds to the step SA7 and follows steps after that, where the door lock control or the door unlock control are executed according to the state of the door lock (steps SA8, SA9). Meanwhile, when it is determined that the signals are not transmitted or the verification is not confirmed (NO), the control sequence ends (End).

—Portable Device—

The door lock control by the portable device 2 will be described.

After the start of the flowchart at the right in FIG. 6, it is determined in step SA1' whether the request signal r is received from the portable device 3 or not. When it is determined herein that the request signal r is received (YES), the ID signal i containing the ID code is transmitted to the portable device 3 in step SA2' and then the control sequence proceeds to step SA3'. Meanwhile, it is determined in the step SA1' that the request signal r is not received (NO), the control sequence proceeds to step SA3', where it is determined whether or not the lock switch 24 or the unlock switch 25 are operated. When it is determined that the switches 24, 25 are operated (YES), the lock signal L or the unlock signal U are transmitted to the portable device 3 along with the ID signal i (step SA4'). Meanwhile, when it is determined that the switches 24, 25 are not operated (NO), the control sequence ends (End).

According to the above-described controls, the door lock control can be executed just by operating the door request switch 35 provided at the door knob when the passenger carrying the portable device 2 verified on the side of the onboard device 3 gets on or off the vehicle 1, thereby improving the utility or facility. Further, a remote control of the door lock/unlock is enabled just by operating the lock/unlock switches 24, 25 provided at the portable device 2.

<Trunk Latch Control>

The trunk latch control that is conducted after closing the trunk lid 11c will be described referring to flowcharts shown in FIGS. 7 and 8.

Figure 7:
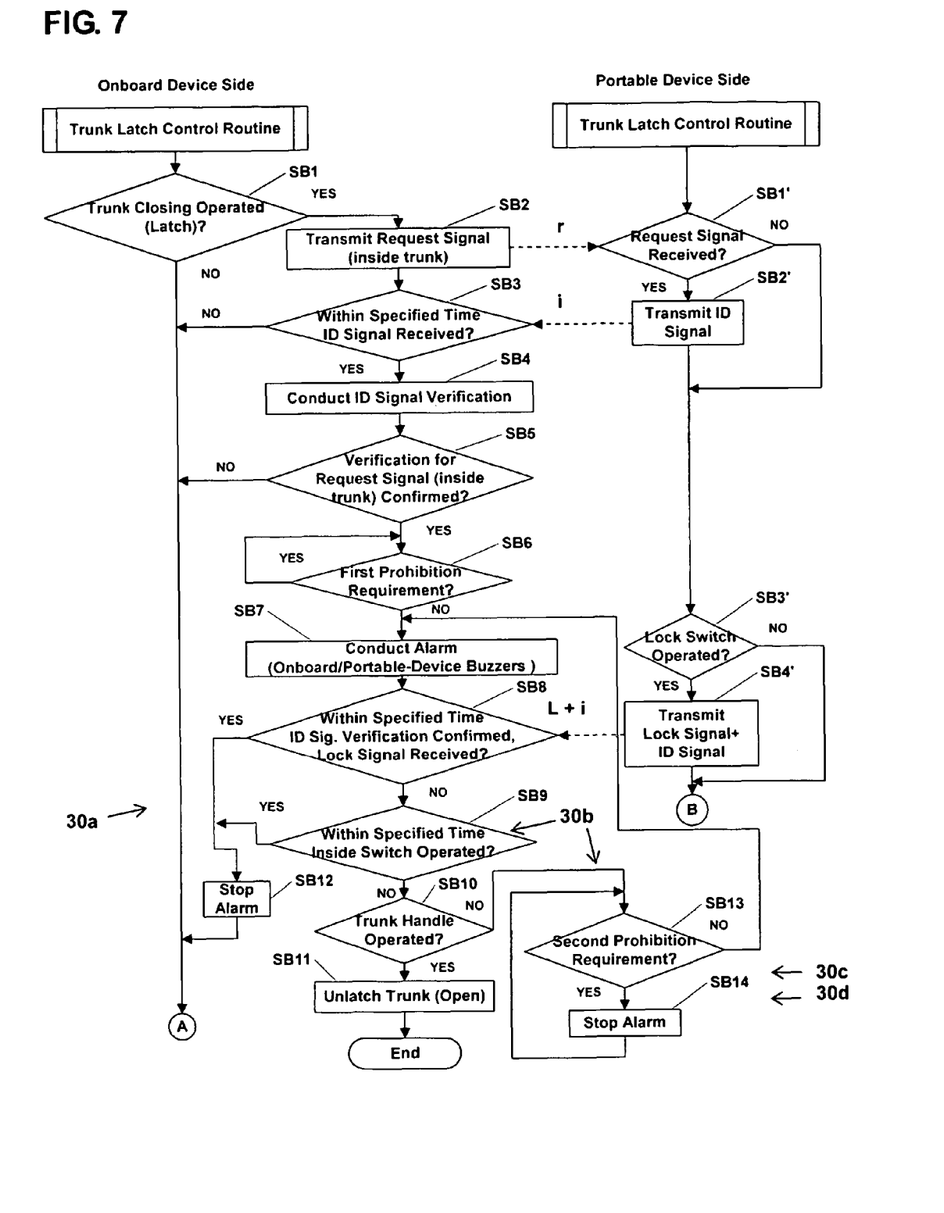
FIG. 7 is flowcharts of a trunk latch control of the onboard device and the portable device.

After the start of the flowchart in FIG. 7, on the side of the portable device 3, it is determined in step SB1 whether the closing operation of the trunk lid 11c is conducted or not (the latch of the trunk latch mechanism 37 is engaged with a corresponding member or not). When it is determined in the step SB1 that the trunk lid 11c is closed and the latch is engaged (YES), the control sequence proceeds to step SB2, where it is determined whether or not the portable device 4 is locked out in the trunk room S. Meanwhile, when it is determined in the step SB1 that the trunk lid 11c is not closed (NO), the control sequence proceeds to step SB15, where it is determined whether the opening operation of the trunk lid 11c is conducted or not, namely whether the trunk handle 38 is operated or not.

In the step SB2, the request signal r is transmitted inside the trunk room S from the signal trunk-inside-transmitting antenna 31. Then, it is determined in step SB3 whether or not the ID signal i from the portable device 4 is received within a specified period of time. Herein, the above-described specified period of time is set to be time enough to receive the ID signal i from the portable device 4 by the signal onboard-receiving antenna 34 after the request signal r is transmitted.

When it is determined in the step SB3 that the ID signal i from the portable device 4 is received within the specified period of time (YES), the verification of the ID code of the ID signal i is conducted and it is determined whether the verification is confirmed or not (steps SB4, SB5). When the verification is confirmed in the step SB5 (YES), it is considered that the portable device 4 is locked out in the trunk room S, and thus the control sequence proceeds to next steps SB6 and after that for conducting the lock-out prevention control. Meanwhile, when it is determined in step SB3 that the ID signal i from the portable device 4 is not received within the specified period of time (NO), or when it is determined in the step SB5 that the verification of the ID signal code is not confirmed (NO), it is considered that the portable device 4 is not locked out in the trunk room S or this verification is not confirmed even if the portable device exists in it, and thus the control sequence proceeds to step SB15, without conducting the lock-out prevention control, where it is determined whether the trunk handle 38 is operated or not.

In the step SB6, it is determined whether or not a specified requirement (first prohibition requirement) to conduct the lock-out prevention control is met. Specifically, this specified requirement is that (i) the ignition switch 39 is in the positions of ON or accessory ON, and (ii) the door is in the unlock state. This is because that in these cases the trunk lid 11c could be opened with the operation of the trunk lever, so there would be no need to conduct the lock-out prevention control.

When it is determined in the step SB6 that the first prohibition requirement is not met (NO), the alarm with the buzzer 41, which is one of the lock-out prevention control, is conducted in subsequent step SB7. This alarm is conducted with the buzzer 41 that is provided on the side of the onboard device 3, and this alarm is stopped when the trunk lid 11c is opened. Herein, this alarm may be conducted with the buzzer 23 that is provided on the side of the portable device, and this alarm may be stopped in a while. Meanwhile, when it is determined in the step SB6 that the first requirement is met (YES), the control sequence stands by until the first prohibition requirement comes not to be met.

After the alarming in the step SB7, the control sequence proceeds to step SB8, where it is determined whether or not the lock signal L from another portable device 2 is received within the specified period time and the verification of the ID signal i transmitted together with the lock signal L is confirmed. When it is determined in the step SB8 that the lock signal L from the portable device 2 is received (YES), the control sequence proceeds to step SB12, where the lock-out prevention control is stopped. Accordingly, since it is considered that the passenger intentionally locate the portable device 4 in the trunk room S when the lock signal L from the another portable device 2 is received, it may be better to stop the lock-out prevention control in terms of the security.

Meanwhile, when it is determined in the step SB8 that the lock signal L from the portable device 2 is not received (NO), the control sequence proceeds to step SB9, where it is determined whether or not the switch 47 provided in the cabin is operated within the specified period of time. This step SB9 is a step for determining whether the passenger is in the vehicle cabin or not. When it is determined that the switch operation is conducted, namely that the passenger is in the cabin (YES), the control sequence proceeds to step SB12, where the alarm is stopped. This is because when the passenger is in the cabin, the trunk lid 11c is enabled to be opened with the trunk lever located in the cabin. Thus, since the lock-out prevention control can be easily stopped with the operation of the switch located in the cabin even when the portable device 2 could not be taken out, the utility or facility can be improved.

When it is determined in the step SB9 that the operation of the switch provided in the cabin is not operated within the specified period of time (NO), the control sequence proceeds to step SB10, where it is determined whether the operation of the trunk handle 38 is operated or not. When it is determined that the operation of the trunk handle 38 is conducted (YES), it is considered that the passenger notices the lock-out of the portable device 4 in the trunk room S and is trying to open the trunk lid 11c, and the latch of the trunk latch mechanism 37 is controlled to the unlatch state in step SB11, without conducting the verification of the ID code with the portable device 2 (even if the passenger does not carry the portable device 2). Accordingly, the passenger can open the trunk lid 11c at the need, and thereby the portable device 4 can be taken out of the trunk room S. After the trunk latch mechanism 37 is made to the unlatch state in the step SB11, the control sequences ends (End).

Meanwhile, when it is determined in step SB10 that the operation of the trunk handle 38 is not conducted (NO), the control sequence proceeds to step SB13, where it is determined whether a specified prohibition requirement (second prohibition requirement) is met or not. This step SB13 is a step to determine whether the lock-out prevention control is temporarily stopped or not. Specifically, this specified requirement is that (i) the ignition switch 39 is in the positions of ON or accessory ON, (ii) the door is in the unlock state, (iii) the vehicle is under travel, and (iv) the door lock operation is conducted in the vehicle cabin. When it is determined that at least one of these is met (YES), the control sequence proceeds to step SB14, where the alarm is stopped temporarily and stands by until the above-described requirements are not met. When it is determined that any of these is not met (NO), the control sequence returns to the step SB7, where the alarm is conducted.

Namely, when the second prohibition requirement is met, it is considered that the passenger is in the cabin and thereby the trunk lid can be opened with the operation of the trunk lever provided in the cabin or that the passenger drives the vehicle by the engine start control, which will be described below, with the portable device 4 being located in the trunk room S, and thus the unnecessary lock-out prevention control is stopped temporarily. And, when the second prohibition requirement is not met, namely, for example, when the vehicle stops or the ignition switch 39 is rotated in the OFF position, NO determination is made in the step SB13 and then the control sequence returns to the step SB7. Accordingly, the lock-out prevention control is restarted.

When the alarm of the lock-out prevention control is stopped in the step SB12, the control sequence proceeds to step SB15 and steps after that, and the normal trunk latch control, in which the trunk latch mechanism 37 is unlatched only when the verification of the ID code with the portable device 2 is confirmed according to the operation of the trunk handle 38, is conducted.

Specifically, it is determined in the step SB15 whether the operation of the trunk handle 38 is conducted or not. When it is determined that the operation of the trunk handle 38 is conducted (YES), the control sequence proceeds to step SB16, where the request signal r is transmitted outside the trunk from the rear transmitting antenna 33c. Then, in the subsequent step SB17 it is determined whether the ID signal i from the portable device 2 is received within a specified period of time or not. When the ID signal i is received within the specified period of time (YES), the verification of the ID code of the ID signal i is conducted and it is determined whether the verification of the ID code is confirmed or not (steps SB18, SB19). When the ID code verification is confirmed in the step SB19 (YES), the control sequence proceeds to step SB20, where the trunk latch mechanism 37 is controlled to the unlatch state, and then ends (End). Meanwhile, when the ID signal i from the portable device 2 is not received within the specified period of time in the step SB17 (NO) and when the ID code verification is not confirmed in the step SB19 (NO), the control sequence ends without granting the unlatch of the trunk latch mechanism 37.

Herein, the step SB11, where the latch of the trunk latch mechanism 37 is controlled to the unlatch state without the confirmation of the ID verification with the portable device in the case where the portable device 4 is locked out in the trunk room S, corresponds to a lock-out prevention control device 30a. The step SB9 that enables to prohibit the above-described unlatch control of the latch mechanism 37 when the specified operation is conducted corresponds to an unlock prohibition device 30b. Also, the step SB13 that enables to prohibit the above-described unlatch control of the latch mechanism 37 when the ignition switch is ON (turned on) or when the vehicle travels corresponds to the unlock prohibition device 30b.

Further, the steps SB13 and SB14, where the conduct of the alarm is prohibited when the ignition switch is ON (turned on) or when the vehicle travels, correspond to an alarm prohibition device 30c. Also, the steps SB13 and SB14, where the conduct of the alarm and the above-described unlatch control are prohibited when the door lock operation is conducted in the vehicle cabin, correspond to a prohibition device 30d.

—Portable Device—

Next, the trunk latch control by the portable device 2 will be described.

After the start of the flowchart at the right in FIG. 7, it is determined in step SB1' whether the request signal r is received from the portable device 3 or not. When it is determined herein that the request signal r is received (YES), the ID signal i containing the ID code is transmitted to the portable device 3 in step SB2' and then the control sequence proceeds to step SB3'.

Meanwhile, it is determined in the step SB1' that the request signal r is not received (NO), the control sequence proceeds to step SB3', where it is determined whether the lock switch 24 is operated or not. When it is determined that the switch 24 is operated (YES), the lock signal L is transmitted to the portable device 3 along with the ID signal i (step SB4') and the control sequence proceeds to step SB5'. Meanwhile, when it is determined that the switch 24 is not operated engine (NO), the control sequence proceeds to the step SB5'.

Figure 8:
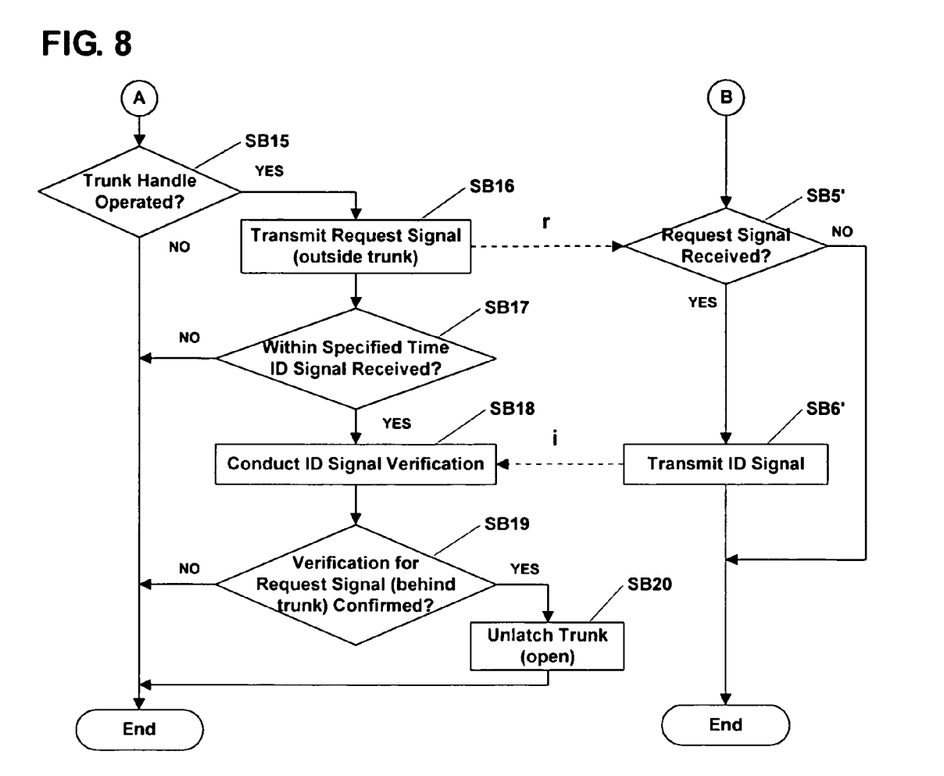
FIG. 8 is flowcharts of another trunk latch control of the onboard device and the portable device.

In the step SB5', as shown in FIG. 8, it is determined whether the request signal r from the rear transmitting antenna 33 is received or not. When it is determined that the request signal r is not received (NO), the control sequence ends (End). When it is determined that the request signal r is received (YES), the ID signal i is transmitted in a subsequent step SB6'. This ID signal i is transmitted in response to the request signal r that is transmitted from the rear transmitting antenna 33c when the trunk handle 38 is operated on the side of the onboard device 3. Herein, when the verification of the ID code contained in the ID signal i is confirmed, the latch of the trunk latch mechanism 37 is controlled to the unlatch state (steps SB18-SB20).

According to the trunk latch control described above, when the operation of the trunk handle 38 is conducted and the ID code verification with the portable device 2 located outside the vehicle is confirmed in the normal state, the latch of the trunk latch mechanism 37 is controlled to the unlatch state, and thereby the trunk lid 11c can be opened. Meanwhile, when the portable device 4 is locked out in the trunk room S, the passenger is notified of the lock-out situation with the alarm and the latch of the trunk latch mechanism 37 is controlled to the unlatch state without using another portable device, and thereby the trunk lid 11c can be opened. Thus, the locked-out portable device 4 can be taken out of the trunk room S surely, improving the utility or facility.

Further, since the lock-out prevention control is prohibited in the case where it is determined that the passenger is in the vehicle cabin, or at driving, or the passenger intentionally leaves the portable device 4 in the trunk room S, the situation where the trunk lid 11c can be opened without the confirmation of the ID verification with another portable device can be restricted. Thereby, both the security and the utility or facility can be attained.

<Engine Start Control>

Figure 9:
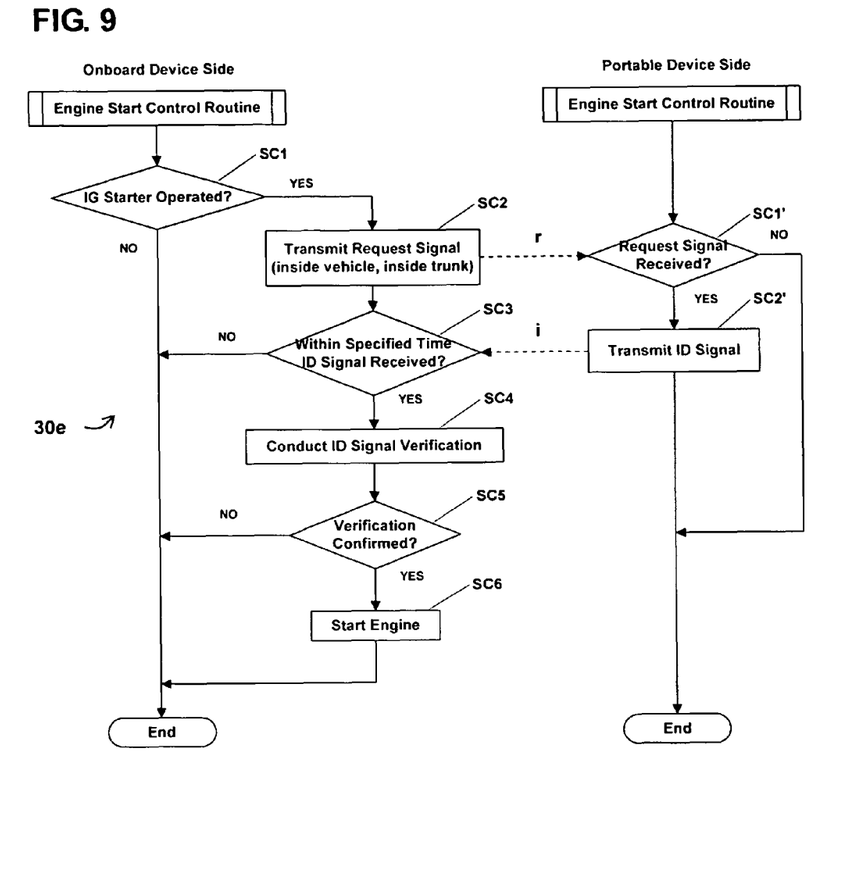
FIG. 9 is flowcharts of an engine start control of the onboard device and the portable device.

Flowcharts of the engine start control by the onboard device 3 and the portable device 2 are shown in FIG. 9. Hereinafter, the flowcharts of FIG. 9 will be described.

First, after the control starts, on the side of the onboard device 3, it is determined whether the operation of the ignition switch 39 (ignition starter) is conducted or not (step SC1). Specifically, it is determined whether or not the ignition switch 39 is rotated to the ignition START position.

When it is determined in the step SC1 that the operation of the ignition switch 39 is not conducted (NO), the control sequence ends (End). When it is determined that the operation of the ignition switch 39 is conducted (YES), the request signal r is transmitted inside the cabin and the trunk room S from the signal inside-transmitting antenna 32 and the signal trunk-inside-transmitting antenna 31 in a subsequent step SC2, and then it is determined whether or not the portable device 2 receives the ID signal i within a specified period of time (step SC3).

When it is determined in the step SC3 that the portable device 2 receives the ID signal i within the specified period of time (YES), the verification of the ID code is conducted and it is determined whether the verification is confirmed or not (steps SC4, SC5). Meanwhile, when it is determined in the step SC3 that the portable device 2 does not receive the ID signal i within the specified period of time (NO), the control sequence ends (End). Herein, the above-described specified period of time in the step SC3 is set to be time enough to receive the ID signal i from the portable device 2 by the signal onboard-receiving antenna 34 after the request signal r is transmitted to the portable device 2.

When it is determined in the step SC5 that the verification of the ID code of the ID signal is confirmed (YES), the smart keyless control unit 30 outputs a signal for granting the engine start to the engine control unit 40 and the engine is started in step SC6. When it is determined that the verification of the ID code of the ID signal is not confirmed (NO), the control sequence ends (End).

Herein, the steps SC1 through SC6, where the verification of the ID code with the portable device 2 according to the ignition switch 39 is conducted and the engine is started with the confirmation of the ID code verification, correspond to an engine start control device 30*e*.

Meanwhile, after the start of the engine start control, on the side of the portable device 2, it is determined in step SC1' whether the request signal r from the onboard device 3 is received or not. When it is determined that the request signal r is received (YES), the ID signal i is transmitted to the onboard device 3 in a subsequent step SC2', and then the control sequence ends (End). When it is determined in the step SC1' that the request signal r is not received (NO), the control sequence ends (End).

Although the ID code verification with the portable device 2 in response to the request signal r is conducted when the ignition switch 39 is rotated to the ignition switch START position in the step SC1, this verification may be conducted in advance when the following requirement is met instead. Specifically, this requirement is that (i) the ignition switch 39 is rotated from the accessory OFF position to the accessory ON position, (ii) at least one of doors is opened from an all-door-closed state, or (iii) all doors are closed from an any-door-opened state. When this requirement is met, there is high likelihood of the ignition switch 39 being rotated to the ignition START position. Accordingly, the verification of the ID code with the portable device 2 is conducted in advance. Thus, at the time the ignition switch 39 is rotate to the ignition START position, the engine is started without the ID code verification, omitting the steps SC2-SC5.

According to the above-described embodiment, in the lock-out prevention control in which when the portable device 4 is locked out in the trunk room S, this situation is notified of the passenger and the latch of the trunk latch mechanism 37 is controlled to the unlatch state according to the operation of the trunk handle 38 without the verification of the ID code with the portable device 2, this lock-out prevention control is prohibited when the door lock operation is conducted by the portable device 2 located outside the vehicle or the operation of the switch 47 located in the vehicle cabin, or when the ignition switch 39 is in the ON position or the vehicle travels. Thereby, in the case where the passenger intentionally puts the portable device 4 in the trunk room S, any unauthorized person can be surely prevented from opening the trunk lid 11*c*. Thus, unnecessary lock-out prevention control can be prohibited, and the utility or facility can be improved without deteriorating the security.

Further, since the lock-out prevention control can be prohibited easily by the operation of the switch located in the vehicle cabin, for example, even in the case where the passenger could not take out the portable device 2 soon or the door lock would not be necessary, the utility or facility can be improved.

Also, since the lock-out prevention control can be also prohibited by the door lock operation in the vehicle cabin, the unnecessary lock-out prevention control can be avoided when the passenger is in the cabin, thereby preventing the deterioration of the security.

Further, the lock-out prevention control is restarted when the ignition switch 39 is rotated to the OFF position or the vehicle stops, the trunk lid 11*c* can be opened easily and thereby the portable device 4 can be taken out of the trunk room S surely when the passenger leaves the vehicle 1, so the utility or facility can be improved.

The present invention should not be limited to the above-described embodiment, and any other modifications and improvements may be applied. For example, although the operation of the door request switch 35 is detected for the door lock/unlock in the above-described embodiment, change of capacitance according to a passenger's hand approaching a door knob may be detected.

Also, although both the alarm and the unlatch control of the trunk latch mechanism 37 are prohibited when the ignition switch 39 is in the ON position or the vehicle travels in the above-described embodiment, only the unlatch control of the trunk latch mechanism 37 may be prohibited. This may be attained by omitting the alarm stop in the step SB14 of FIG. 7.

Also, although the vehicle 1 is the open car type of vehicle in the above-described embodiment, any other types of vehicle, such as sedan type, can be applied.

What is claimed is:

1. A smart entry system for a vehicle, comprising:
an onboard transmitter operative to transmit a request signal at least to the inside of a trunk of the vehicle and to the outside of the vehicle, which are separated from a vehicle cabin of the vehicle;
a portable device operative to transmit an ID signal when receiving the request signal from the onboard transmitter;
an onboard receiver operative to receive the ID signal from the portable device;
a trunk lid unlock control device operative to control said onboard transmitter to transmit the request signal to the outside of the vehicle when a trunk handle provided on the vehicle for opening a trunk lid of the vehicle is operated, and conduct a control of unlocking the trunk lid when ID verification is confirmed based on the ID signal received by said onboard receiver in response to the request signal transmitted by said onboard transmitter to the outside of the vehicle;
a lock-out prevention control device operative to control said onboard transmitter to transmit the request signal to the inside of the trunk when the trunk lid is closed and locked, and conduct the control of unlocking the trunk lid according to an operation of the trunk handle when the ID verification is confirmed based on the ID signal received by said onboard receiver in response to the request signal transmitted by said onboard transmitter to the inside of the trunk; and an unlock prohibition device operative to prohibit said lock-out prevention control device from conducting the control of unlocking the trunk lid when an operation of a switch located inside the vehicle cabin and adapted to operate devices other than functions fulfilled by the smart entry system is conducted, wherein said switch comprises at least one of an audio switch and an air conditioner switch.

* * * * *